Jan. 16, 1951  V. C. SHIDLER  2,538,387
THERMOSTATIC SWITCH
Filed Aug. 18, 1949

INVENTOR,
Virgil C. Shidler
BY
Henry Molz
ATTORNEY.

Patented Jan. 16, 1951

2,538,387

UNITED STATES PATENT OFFICE 2,538,387

THERMOSTATIC SWITCH

Virgil C. Shidler, Glendale, Calif.

Application August 18, 1949, Serial No. 111,002

3 Claims. (Cl. 200—137)

The primary object of my invention is to provide a means for controlling the temperature of the heat applied to crucibles or pots for melting metal, as for example, the pots used in the printing trades in connection with Linotype and Intertype machines, as well as for similar machines and devices adapted to the use of molten metals regardless of purpose and use;

It is thus an important object of my invention to provide a device that will positively control the temperature of the heat employed in the melting of metals and hold it within the approximate degree of heat to which set;

A further object of my invention is to provide a device of said character which combines the principle of bi-metal actuating mechanism in conjunction with an extremely high speed switch, and which may be pre-set to any degree of temperature and left to operate without attention, adjustment and repair;

A further object of my invention is to provide a device that may readily be installed on old and new machines alike, without special technical skill, in less time and with less material than is required in the installation of similar devices in use, left to operate trouble-free, and in an economical manner;

A further object of my invention is to provide a device constructed without the customary troublesome and complicated relay systems in use with their incident loss of machine production time;

A further object of my invention is to provide a device readily permitting the removal of any type of pot lid without affecting the switch-actuating mechanism when replacing a damaged heating element, more or less a common occurrence with similar devices yet permitting removal of the switch and indicating light means while maintaining constant control with the pot;

A still further object of my invention is to provide a device readily adapted to direct current electrical energy as well as alternating current to which it is more generally applied, free from arcing and burning of switch contact points, more or less prevalent with similar devices in use due to rocking and vibration of the metal pot, and which may be used on pots having immersion-type heating elements, impossible on certain other types of heat control devices in use;

And a further object of my device is to provide a device which does not disturb the mouthpiece and throat heaters of machines of the Linotype and Intertype class, for example, and which are commonly manually regulated by rheostat means.

I attain these objects by the device illustrated in the accompanying drawings, in which.

Figure 1:
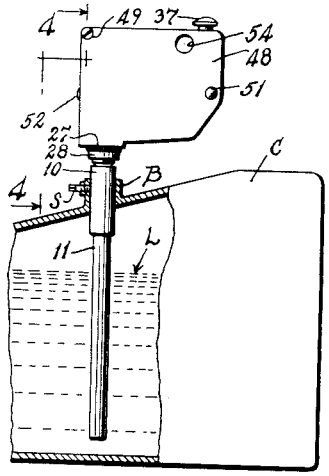
Figure 1 is an elevation of the device attached to a fragmentary portion of a pot or crucible.
Figure 2:
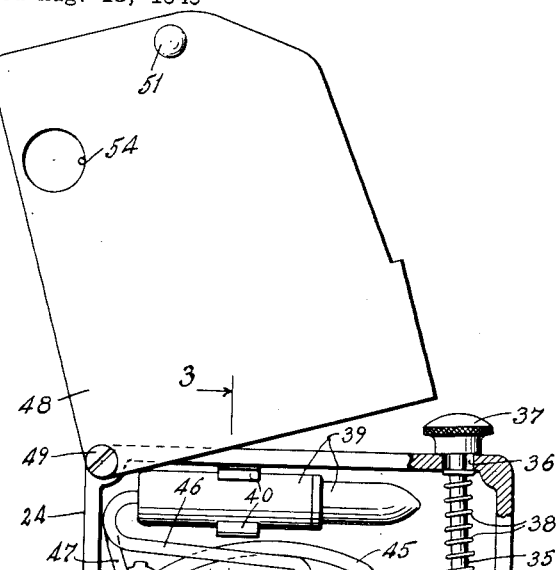
Figure 2 is an enlarged view of the device with the cover raised showing certain parts thereof broken away and in section.
Figures 3, 4:
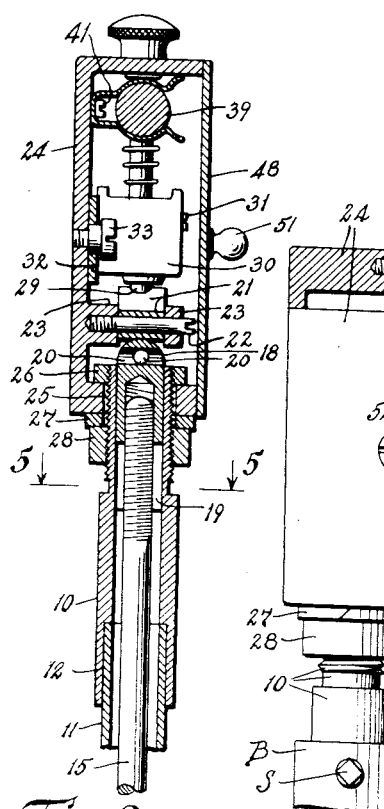
Figure 3 is a section taken on the staggered line 3—3 of Fig. 2.
Figure 4 is a view partly in section taken on line 4—4 of Fig. 1.
Figure 5:
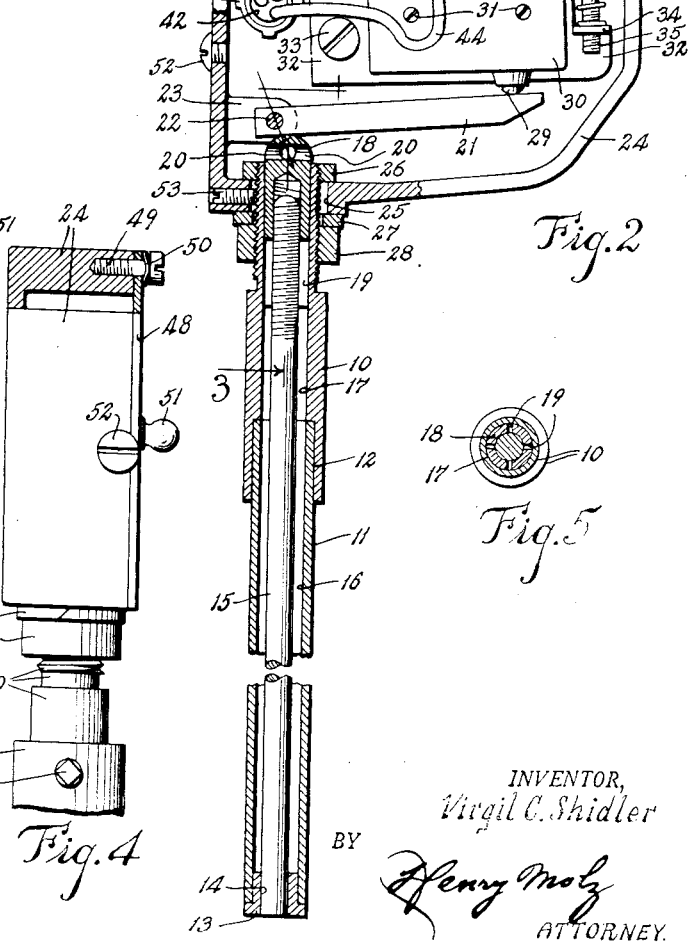
Figure 5 is a transverse section on line 5—5 of Fig. 3.

Similar numerals and letters of reference indicate like parts throughout the several views. Thus, the device proper is supported by its hollow stem 10, which in turn is held vertically in the bore of a boss B provided on the cover of a crucible or pot C by means of a set screw S;

A tube 11 is axially aligned and secured into the lower end of the stem 10 at 12. It extends downwardly well into the crucible C and is closed by a plug 13 secured into the lower end of the tube 11. The plug 13 is provided with a bore 14. The lower end of a rod 15 is adequately as by brazing, secured into the bore 14. The rod 15 and tube 11 are formed of metal of differential expansion properties.

The rod 15 extends upwardly through the bore 16 of the tube 11 and the bore 17 of the stem 10. The rod 15 is further threaded about its upper end for contact with a turn-buckle 18 provided to slipfit into the upper end of the bore 17.

Slots 19 split the lower end of the turn-buckle 18 to provide a spring like grip about the rod 15. Transverse holes 20, 20 are provided through the upper end of the turn-buckle 18. The latter is rounded on its upper end and extends above the stem 10 into engagement with a lever 21 having one end pivotly mounted on a screw 22 threaded into a bifurcated boss 23 provided upon the inner wall of a switch box 24. The floor of the latter is provided with an aperture 25 which loosely fits over the threaded upper end of the stem 10.

A nut 26 threaded about the upper end of the stem 10 above the floor of the switch box 24, a lock washer 27 and a nut 28 below said floor provide means for holding the switch box at the upper end of the stem 10.

The outer or free end of the lever 21 is positioned to engage a switch button 29 of a switch 30. The latter is secured by screws 31, 31 to a plate 32 pivotly mounted on a screw 33 threaded into the back of the switch box 24.

A lug 34 is struck out horizontally from the plate 32 and is threaded to receive the lower threaded end of a screw 35 extending downwardly into said switch box 24 through an aperture 36 provided through the top of the switch box 24. The other end of the screw 35 has a knob 37 formed integral thereof. An expansion spring 38 is positioned about the screw 35 between the lug 34 and the top of the switch box 24.

An indicator lamp 39 is mounted within the switch box 24 in a spring-clip 40 secured by a screw 41 to the back of the switch box 24.

Suitable electric conduit 42 is mounted through the back of the switch-box 24 by a ring-nut 43. Wires 44 and 45 lead from the conduit 42 to the switch 30. A wire 46 connects the lamp 39 to the switch 30, and another wire 47 extends from the lamp 39 back through the conduit 42 to a suitable ground.

A cover plate 48 is pivotly mounted to one corner of the switch box 24 by means of a screw 49. A spring washer 50 beneath the head of said screw 49 exerts pressure against said cover plate 48 to hold it in engagement with the switch box 24.

A knob 51 is provided for lifting the cover plate 48, one edge of the latter resting against the head of the screw 52 affixed to the side of the switch box 24 when the plate is closed.

A screw 53 is provided to fix the position of the stem 10 in the aperture 25 in the switch box 24.

An aperture 54 in the cover-plate 48 serves as a viewing means to the indicator lamp 39. Said lamp is lit when the circuit is energized, and conversely, it is unlit when not energized.

In operation, the tube 11 and the rod 15 being formed of metals having different coefficients of expansion, act as a bi-metal thermostat. The switch 30 operates to close the electrical circuit when the switch button 29 is pushed in, and opens the circuit when it is moved out from the switch 30.

The device is detachably secured to the pot or crucible C by means of the set screw S. The knob 37 is turned to cause the spring 38 to pivot the switch 30 about the screw 33 until pressure of the button 29 against the lever 21 causes the switch 30 to close the electrical circuit, light the lamp 39, and energize the electric heater (not shown) of the crucible or pot C.

As the heated liquid L in the crucible C rises in temperature, the tube 11 will expand longitudinally. As the rod 15 does not expand as rapidly as the tube 11, the more rapid expansion of the tube 11 causes the plug 13 to lower which in turn pulls down on the rod 15. At the desired critical point of temperature rise, the rod 15 exerts a downward pull on the knuckle 18 to cause the lever 21 to move away from the button 29 and in turn open the switch, lamp circuit, and crucible heater from being further electrically energized.

When the liquid L in the crucible C cools sufficiently so as to reach the lowest desired temperature, the tube 11 will have contracted longitudinally until the rod 15 by reason thereof is automatically pushed upwardly against the knuckle 18, whereupon pressure on the lever 21 and the button 29 will again close the electrical circuit to cause the lamp 39 to light, and also to energize the crucible heater.

This operation is entirely automatic in action. The pre-determined heat temperature controls, and makes and breaks the electric circuit in conformity therewith.

A finer adjustment of the switch control may be made by inserting a suitable pin in the holes 20, 20 and therewith turning the knuckle 18 upon the threads of the rod 15.

In practice as ordinarily used, the device as shown in the drawings is wired for alternating current. The addition of proper condensers, however, (not shown), will as readily adapt it to direct current use.

The device entirely eliminates the complicated relay system and governor in general use in connection with metal heating pots as are common to Linotype and similar machines in the printing industry for melting metal in casting slugs and rules, for example.

The inherent slowness of the governor in its reaction responsive to the wide range of degrees in temperature usually prevalent under conditions of inadequate control during the heating process, has made the governor extremely unsatisfactory as a reliable temperature governing and control medium.

For satisfactory results, the temperature must be held closely to a pre-determined degree, and in any event, it ought not vary in excess of ten degrees therefrom. Moreover, the almost constant governor repairs necessitated in its operation coupled with the complicated relay system, has made complete dependence upon either or both not only foolhardy, but also highly impractical in the uses and purpose each is to serve. My device eliminates these undesirable features.

Produced from materials readily obtainable in the open market and at no great cost, the device forms a compact unit that takes but little room, is out-of-the-way when installed, and does not interfere with the operation of the machine to which it is attached.

It should be apparent that changes in structure may from time to time readily suggest themselves, but within the scope of the herein invention. Hence, I do not limit the invention to the exact description and structural arrangement shown, but what I do claim is:

1. In a temperature control means for an electrically heated melting pot, a hollow stem, means for detachably securing said stem to said pot, a tube coaxially supported by said stem so as to depend into the pot, a rod mounted in said stem and tube with one end fixed to said tube and its other free in said stem, said rod having a different coefficient of expansion than said tube and forming therewith a thermostat, a housing, means for detachably securing said housing to said stem, an adjusting member axially adjustable on the free end of said rod and guided in the bore of said stem and extending into said housing, a switch in said housing for controlling the operation of the heating means for the pot, a support for said switch adjustably mounted in said housing for disposing the switch in different positions, a lever in said housing operable between said switch and said adjusting member on said rod for opening and closing said switch responsive to thermostatic action of said rod and tube, and means carried by said housing for adjusting said switch support to dispose said switch in positions relative to said lever to vary the opening and closing action of the switch responsive to thermostatic action of said rod and tube.

2. In a temperature control means for an electrically heated melting pot, a hollow stem, means for detachably securing said stem to said pot, a tube coaxially supported in one end of said stem so as to depend into the pot, a rod mounted in said stem and tube with one end fixed to said tube and its other free in said stem, said rod having a different coefficient of expansion than said tube and forming therewith a thermostat, a housing, means for detachably securing said housing to the other end of said stem, an adjusting member axially adjustable on the free end of said rod being guided in the bore of said stem and having a rounded end extending into said housing, a switch in said housing for controlling the operation of the heating means for the pot, a support for said switch adjustably mounted in said housing for disposing the switch in different positions, a lever in said housing operable between said switch and the rounded end of said adjusting member on said rod for opening and closing said switch responsive to thermostatic action of said rod and tube, and means carried by said housing for adjusting said switch support to dispose said switch in positions relative to said lever to vary the opening and closing action of the switch responsive to thermostatic action of said rod and tube.

3. In a temperature control means for an electrically heated melting pot, a hollow stem, means for detachably securing said stem to said pot, a tube connected with one end of said stem so as to depend into the pot, a rod mounted in said stem and tube with one end fixed to said tube and its other free in said stem, said rod having a different coefficient of expansion than said tube and forming therewith a thermostat, a housing, means for detachably securing said housing to the other end of said stem, an adjusting member axially adjustable on the free end of said rod being movable freely within the bore of said stem and having an end thereof extending into said housing, a switch in said housing for controlling the operation of the heating means for the pot, a support for said switch adjustably mounted in said housing for disposing the switch in different positions, a lever mounted on said housing and bearing against said end of said adjusting member for opening and closing said switch responsive to thermostatic action of said rod and tube, means carried by said housing for adjusting said switch support to dispose said switch in positions relative to said lever to vary the opening and closing action of the switch responsive to thermostatic action of said rod and tube, said means for detachably securing said housing to said stem comprising an externally screw threaded portion on said stem, said housing having an opening therein through which the stem extends and a nut threaded on said screw threaded portion of said stem within said housing whereby the housing and lever may be lifted clear of the stem and the adjusting member on said rod, on removal of said nut.

VIRGIL C. SHIDLER.

REFERENCES CITED

The following references are of record in the file of this patent:

UNITED STATES PATENTS

| Number | Name | Date |
| --- | --- | --- |
| 1,746,574 | Baker et al. | Feb. 11, 1930 |
| 1,945,706 | Satchwell | Feb. 6, 1934 |
| 2,109,790 | Batcheller | Mar. 1, 1938 |
| 2,420,352 | Burling | May 13, 1947 |
| 2,498,988 | Eden et al. | Feb. 28, 1950 |